United States Patent [19]

Matsushita et al.

[11] Patent Number: 4,828,619

[45] Date of Patent: May 9, 1989

[54] AIR-ENTRAINING AGENT FOR FLYASH CEMENT COMPOSITION

[75] Inventors: Souji Matsushita; Setsuro Shimizu, both of Chigasaki; Toru Takeuchi; Susumi Tahara, both of Tsukuba, all of Japan

[73] Assignee: Fujisawa Pharmaceutical Co., Ltd., Osaka, Japan

[21] Appl. No.: 155,502

[22] Filed: Feb. 12, 1988

[30] Foreign Application Priority Data

Feb. 18, 1987 [JP] Japan .................................. 62-036738
Sep. 14, 1987 [JP] Japan .................................. 62-230065

[51] Int. Cl.$^4$ .............................................. C04B 24/08
[52] U.S. Cl. ........................................ 106/95; 106/86; 106/314; 106/DIG. 1
[58] Field of Search .............. 106/95, 86, 314, DIG. 1

[56] References Cited

U.S. PATENT DOCUMENTS

| 3,537,869 | 11/1970 | Proell .................................... | 106/95 |
| 4,207,115 | 6/1980 | Boehme et al. ....................... | 106/95 |
| 4,360,452 | 11/1982 | Zabrocki et al. ..................... | 106/95 |
| 4,434,257 | 2/1984 | Narisawa et al. .................... | 106/95 |

FOREIGN PATENT DOCUMENTS 8501500 4/1985 PCT Int'l Appl. ........... 106/DIG. 1

Primary Examiner—William R. Dixon, Jr.
Assistant Examiner—David M. Brunsman
Attorney, Agent, or Firm—Oblon, Fisher, Spivak, McClelland & Maier

[57] ABSTRACT

The invention relates to a composition comprising flyash cement and an air-entraining agent selected from the group consisting of polyoxyethylene polyalcohol fatty acid esters, polyethylene glycol fatty acid esters, polyoxyethylene pentaerythritol fatty acid esters and polyoxyethylene sorbitan fatty acid esters, and a fatty acid or salt thereof.

10 Claims, No Drawings

AIR-ENTRAINING AGENT FOR FLYASH CEMENT COMPOSITION

The present invention relates to an improved air-entraining agent (hereinafter referred to as AE agent) for flyash cement compositions.

The term 'flyash cement composition' is used herein to mean a mortar or concrete obtainable by mixing flyash-containing cement, as a hydraulic binder, with water and aggregate material.

The flyash cement composition has been used widely in mass concretes such as dam structures as a low exothermic low-cost construction material and has recently been gathering attention as an agent to prevent alkali-aggregate reaction. However, since the flyash cement composition characteristically suffers from a considerable loss of entrained air (hereinafter referred to as air loss) with time during the period from immediately after mixing to completion of work, the appropriate approach to overcome this disadvantage has been much explored. The presence of entrained air cells or voids in an appropriate total volume in concrete is essential to the maintenance of good workability of fresh concrete and also for the purpose of improving the durability to freezing and thawing of hardened concrete.

The present invention is concerned with an AE agent for entraining an appropriate quantity of air at the mixing stage in the preparation of flyash cement composition and, at the same time, for controlling the air loss.

In order to have a sufficient quantity of air entrained into flyash cement composition, the same AE agents as used for ordinary portland cement-containing cement compositions have been generally employed. For example, anionic surfactants such as polyoxyethylene alkyl ether sulfates or polyoxyethylene alkyl phenyl ether sulfates or salts thereof, polyoxyethylene alkyl ether phosphates or polyoxyethylene alkyl phenyl ether phosphates or salts thereof, alkylbenzenesulfonic acids or salts thereof, α-olefin-sulfonic acids or salts thereof, resin acid or salts thereof, fatty acids or salts thereof, and the like are used. When any of such known AE agents is used in the ordinary portland cement-containing cement composition, there occurs no remarkable air loss, and no problem is caused with concrete quality. However, if such an AE agent is used in flyash cement composition, several problems such as requirement of a high addition level or an increased amount of air loss are encountered. These events are generally attributed to the unburned carbon contained in the flyash, but in the absence of an adequate available countermeasure, it has been unavoidable to take a delicate procedure of estimating the amount of air loss after a given time for each lot and to decide on the addition level of an AE agent.

As an attempt to overcome these problems, attention has recently been focused on the air-entraining action of polyoxyethylene polyalcohol fatty acid esters.

When a polyoxyethylene polyalcohol fatty acid ester is used as an AE agent in flyash cement composition, there is certainly obtained flyash cement composition with a smaller air loss as compared with compositions obtained with the known AE agents. However, the cement composition thus obtained is not still satisfactory in the following aspects.

(1) High level of addition required.
(2) Not sufficiently effective for unburned carbon-rich flyash.

The two aspects (1) and (2) will be discussed in further detail. With regard to (1), a major reason for using flyash cement for cement compositions is inherently its economic cost and the underlying motive is to obtain an inexpensive cement composition by using inexpensive flyash as a substitute for cement. Therefore, the use of a costly additive in a large quantity for solving the problems of air loss, etc. due to addition of flyash to a cement composition would cancel out one of its merits.

With regard to (2), when flyash cement composition is prepared using a polyoxyethylene polyalcohol fatty acid ester as an AE agent, the polyoxyethylene polyalcohol fatty acid ester does not sufficiently exhibit its preventive effect on air loss in the case where the flyash is rich in unburned carbon. In this connection, because of other problems such as the reduction in combustion temperature which is necessitated by the enactment and enforcement of stricter environmental control regulations over sulfur dioxide gas and nitrogen oxide, there has recently been a trend for a greater proportion of unburned carbon-rich flyash to be byproduced. It is, therefore, an increasingly important requirement to manufacture flyash cement composition with smaller air losses by utilizing such flyash containing a large amount of unburned carbon.

However, flyash cement composition containing unburned carbon-rich flyash usually requires an increased amount of an AE agent for incorporation of the proper air content and suffers from a large air loss, and this air loss cannot be precluded by the mere addition of a polyoxyethylene polyalcohol fatty acid ester.

The present invention has as its object to provide flyash cement composition with a minimum of air loss even where the flyash is rich in unburned carbon.

The term 'flyash cement' is used herein to mean a mixture of ordinary portland cement and flyash, which contains 5 to 40 percent by weight of flyash therein. It should, of course, be understood that the invention encompasses not only the manufacture of flyash cement composition using such a mixture, but also the field mixing of ordinary portland cement and flyash, for example at the site of preparation of a cement composition.

The intensive research undertaken by the inventors for overcoming the above problems revealed that the problems (1) and (2) can be resolved by using, in combination, a compound A selected from the group consisting of polyoxyethylene polyalcohol fatty acid esters of the general formula:

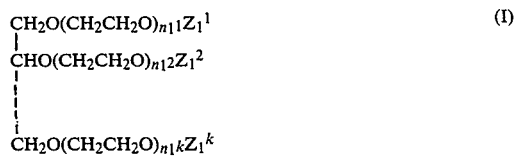

$$\begin{array}{l} CH_2O(CH_2CH_2O)_{n_1^1}Z_1^1 \\ | \\ CHO(CH_2CH_2O)_{n_1^2}Z_1^2 \\ | \\ \vdots \\ | \\ CH_2O(CH_2CH_2O)_{n_1^k}Z_1^k \end{array} \quad (I)$$

wherein k is a whole number of 2 to 8; $n_1^1, n_1^2, \ldots$ and $n_1^k$ each is a whole number of 0 to 40; $Z_1^1, Z_1^2 \ldots$ and $Z_1^k$ each is a hydrogen atom or a residue group available on elimination of a hydroxy group from a fatty acid of 10 to 30 carbon atoms, provided that at least one of $Z_1^1, Z_1^2 \ldots$ and $Z_1^k$ is such a residue group available on elimination of a hydroxy group from a fatty acid of 10 to 30 carbon atoms; and $n_1^1 + n_1^2 + \ldots + n_1^k$ is a whole number of 10 to 60;

polyethylene glycol fatty acid esters of the general formula:

wherein $n_2$ is a whole number of 10 to 40 and $Z_2$ is a residue group available on elimination of a hydroxy group from a fatty acid of 10 to 30 carbon atoms; polyoxyethylene pentaerythritol fatty acid esters of the general formula:

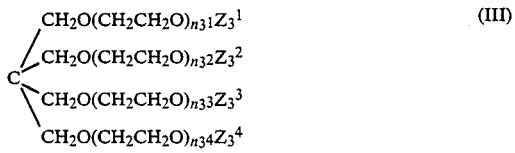

wherein $n_3^1$, $n_3^2$, $n_3^3$ and $n_3^4$ each is a whole number of 0 to 40; $Z_3^1$, $Z_3^2$, $Z_3^3$ and $Z_3^4$ each is a hydrogen atom or a residue group available on elimination of a hydroxy group from a fatty acid of 10 to 30 carbon atoms, provided that at least one of $Z_3^1$, $Z_3^2$, $Z_3^3$ and $Z_3^4$ is such a residue group available on elimination of a hydroxy group from a fatty acid of 10 to 30 carbon atoms; and $n_3^1+n_3^2+n_3^3+n_3^4$ is a whole number of 10 to 60; and polyoxyethylene sorbitan fatty acid esters of the general formula:

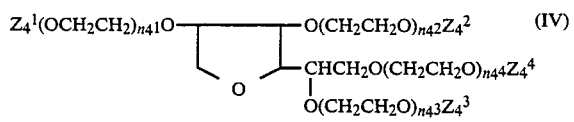

wherein $n_4^1$, $n_4^2$, $n_4^3$ and $n_4^4$ each is a whole number of 0 to 40; $Z_4^1$, $Z_4^2$, $Z_4^3$ and $Z_4^4$ each is a hydrogen atom or a residue group available on elimination of a hydroxy group from a fatty acid of 10 to 30 carbon atoms, provided that at least one of $Z_4^1$, $Z_4^2$, $Z_4^3$ and $Z_4^4$ is such a residue group available on elimination of a hydroxy group from a fatty acid of 10 to 30 carbon atoms; and $n_4^1+n_4^2+n_4^3+n_4^4$ is a whole number of 10 to 60; and a compound B which is a fatty acid of 10 to 30 carbon atoms or a salt thereof. The present invention has been developed on the basis of the above finding.

Referring to general formulas (I), (II), (III) and (IV), the residue group derived from a fatty acid of 10 to 30 carbon atoms means the residue group available on elimination of one hydroxy group from a saturated or unsaturated, straight-chain or branched fatty acid containing 10 to 30 carbon atoms and more specifically means the residue available on elimination of a hydroxy group from lauric acid, myristic acid, palmitic acid, stearic acid, oleic acid, elaidic acid, linoleic acid, linolenic acid or the like. [For example, the residue group available on elimination of one hydroxy group from oleic acid will hereinafter be referred to briefly as "oleic acid residue"]

Referring, now, to general formula (I), $n_1^1$, $n_1^2$, ... and $n_1^k$ each is preferably a whole number of 0 to 20 [$n_1^k=0$ means that $(CH_2CH_2O)_{n_1^k}$ represents a bond; the same applies to $n_3^1$, ... $n_2^4$ and $n_4^1$ ... $n_4^4$] and $n_1^1+n_1^2+\ldots+n_1^k$ is preferably a whole number of 20 to 50. Preferably, k is a whole number of 2 to 6.

Referring, now, to general formula (II), $n_2$ is preferably a whole number of 10 to 20.

Referring to general formula (III), $n_3^1$, $n_3^2$, $n_3^3$ and $n_3^4$ each is preferably a whole number of 0 to 50 and $n_3^1+n_3^2+n_3^3+n_3^4$ is a whole number of 20 to 60.

Referring to general formula (IV), $n_4^1$, $n_4^2$, $n_4^3$ and $n_4^4$ each is preferably a whole number of 0 to 20 and $n_4^1+n_4^2+n_4^3+n_4^4$ is preferably a whole number of 20 to 50.

Among the various families of compound A, the compounds of general formula (IV) may at times be represented by the following general formula:

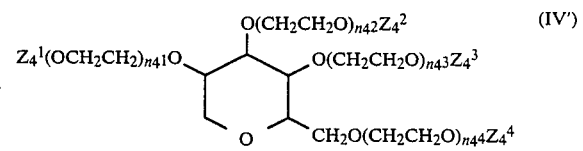

wherein $n_4^1$, $n_4^2$, $n_4^3$ and $n_4^4$ and $Z_4^1$, $Z_4^2$, $Z_4^3$ and $Z_4^4$ respectively have the same meanings as defined above, but the two formulas designate the same compounds.

The fatty acid of 10 to 30 carbon atoms or a salt thereof, which is compound B, is a saturated or unsaturated, straight-chain or branched fatty acid containing 10 to 30 carbon atoms or a salt thereof. Preferably, those containing 10 to 18 carbon atoms, such as lauric acid, myristic acid, palmitic acid, oleic acid, linoleic acid, linolenic acid, etc., may be mentioned. Tall oil fatty acid which is predominantly composed of oleic acid and linoleic acid, for instance, is also included in the definition of said fatty acid. The salt of such fatty acid includes alkali metal salts (sodium salt, potassium salt, etc.), alkaline earth metal salts (calcium salt, magnesium salt, etc.) and the like.

As the AE agent according to the present invention, its component compound A and compound B may be used as they are or, if necessary, as dissolved in water or a suitable solvent. In dissolving compound A and compound B in water or said suitable solvent, a suitable alkali may be added. Moreover, compound A and compound B each may be a mixture of two or more species.

While there is no particular limitation on the relative amount of compounds A and B in the AE agent of the invention, a combination of 50 to 95 parts by weight of compound A with 50 to 5 parts by weight of compound B is preferred.

The level of addition of the AE agent of the invention to flyash cement composition depends on the species of compounds A and B and the kind of flyash cement, but is generally in the range of about 0.001 to 0.2 percent and preferably about 0.01 to 0.1 percent based on the flyash cement.

The AE agent of the invention, consisting of compound A and compound B, when added to flyash cement composition, exhibits an outstandingly high air entraining action and, at the same time, an excellent air loss-inhibitory effect as will be obvious from the test data given below.

The following tests are illustrative of the effects of the invention.

Test 1

Preparation of test mortar:

Using a mixer meeting the requirements of JIS R 5201—Physical Testing Methods of Cement—, 300 g of water containing the test compounds, 600 g of a hydraulic binder and 1500 g of sand were mixed together for 4 minutes.

Hydraulic binder:

Flyash cement: A 75:25 mixture of ordinary portland cement (specific gravity 3.16) and flyash (specific gravity 2.06, specific surface area 3350 cm²/g, loss on ignition 4.61%, methylene blue adsorption 0.98 mg/g)

Sand: River sand (specific gravity 2.63, FM 2.69)

Note: The loss on ignition is mainly derived from the unburned carbon content.

Test compound:

(1) Compound A

A 50:50 mixture of a polyoxyethylene sorbitol dioleate of general formula (I) wherein k is 6 and two of $Z_1^1$, $Z_1^2$... and $Z_1^6$ are oleic acid residues with the remaining four being hydrogen atoms and a polyoxyethylene sorbitol trioleate of general formula (I) wherein k is 6, three of $Z_1^1$, $Z_1^2$, ... and $Z_1^6$ are oleic acid residues, with the remaining three being hydrogen atoms, and $n_1^1 + n_1^2 + \ldots + n_1^6$ is 40 (this mixture will hereinafter be referred to briefly as $A_1$-1).

(2) Compound B

Tall oil fatty acid potassium (fatty acid 96.9%, resin acid 0.6%) (hereinafter referred to briefly as B-1).

Test method:

(1) Measurement of air content

In accordance with JIS A 1116—Method of Test for Unit Weight and Air Content (Gravimetric) of Fresh Concrete—, the air content in the fresh mortar immediately after mixing was measured by the gravimetric method using a 700 ml vessel.

(2) Measurement of slump

The slump of the fresh mortar immediately after mixing was measured in accordance with JIS A 1101 —Method of Test for Slump of Concrete—with the modification that a slump cone on ½ scale was used.

Results

The results are shown in Table 1.

In Table 1, 'entrained air' means the air content in each mortar minus the air content (entrapped air) in the mortar (plain) not containing the test compound and can be interpreted as the air content entrained by the AE action of the test compound. When the test compound is a mixture of compound A and compound B, the measured entrained air value represents the measured air content minus the amount of entrapped air, whereas the predicted entrained air value is the sum of the amounts of air entrained when compound A and compound B are independently added as test compounds.

TABLE 1

| Dosage of addition of test compound (%) | | | | Air content (%) | Entrained air (%) | | Slump (cm) |
| --- | --- | --- | --- | --- | --- | --- | --- |
| $A_1-1+B-1$ | $A_1-1$ | B | $A_1-1/B-1$ | | Predicted | Measured | |
| — | — | — | 0/0 | 1.1 | — | — | 6.9 |
| 0.004 | 0.004 | — | 100/0 | 1.2 | — | 0.1 | 7.3 |
| 0.01 | 0.01 | — | 100/0 | 1.3 | — | 0.2 | 7.3 |
| 0.015 | 0.015 | — | 100/0 | 1.5 | — | 0.4 | 7.1 |
| 0.02 | 0.02 | — | 100/0 | 1.7 | — | 0.6 | 6.9 |
| 0.03 | 0.03 | — | 100/0 | 2.0 | — | 0.9 | 7.1 |
| 0.04 | 0.04 | — | 100/0 | 2.0 | — | 0.9 | 7.1 |
| 0.05 | 0.05 | — | 100/0 | 2.5 | — | 1.4 | 7.0 |
| 0.10 | 0.10 | — | 100/0 | 6.8 | — | 5.7 | 9.3 |
| 0.005 | — | 0.005 | 0/100 | 1.1 | — | 0 | 7.2 |
| 0.01 | — | 0.01 | 0/100 | 1.2 | — | 0.1 | 6.8 |
| 0.015 | — | 0.015 | 0/100 | 1.5 | — | 0.4 | 6.8 |
| 0.02 | — | 0.02 | 0/100 | 1.8 | — | 0.7 | 6.8 |
| 0.03 | — | 0.03 | 0/100 | 2.5 | — | 1.4 | 6.8 |
| 0.04 | — | 0.04 | 0/100 | 3.3 | — | 2.2 | 6.7 |
| 0.12 | — | 0.12 | 0/100 | 7.0 | — | 5.9 | 6.3 |
| 0.055 | 0.05 | 0.005 | 100/10 | 6.5 | 1.4 | 5.4 | 8.5 |
| 0.05 | 0.04 | 0.01 | 100/25 | 6.9 | 1.0 | 5.8 | 8.4 |
| 0.045 | 0.03 | 0.015 | 100/50 | 6.0 | 1.3 | 4.9 | 7.5 |
| 0.04 | 0.02 | 0.02 | 100/100 | 6.1 | 1.3 | 5.0 | 7.3 |
| 0.045 | 0.015 | 0.03 | 50/100 | 7.2 | 1.8 | 6.1 | 7.3 |
| 0.05 | 0.01 | 0.04 | 25/100 | 8.0 | 2.4 | 6.9 | 7.0 |
| 0.044 | 0.004 | 0.04 | 10/100 | 7.3 | 2.3 | 6.2 | 6.7 |

The dosage of addition of each test compound represents percentage of weight of flyash cement.
(The same applies hereinafter)

Test 2

The test procedure of Test 1 was repeated except that potassium oleate (hereinafter referred to briefly as B-2) was used in lieu of tall oil fatty acid potassium.

The results are shown in Table 2.

TABLE 2

| Dosage of addition of test compound (%) | | | | Air content (%) | Entrained air (%) | | Slump (cm) |
| --- | --- | --- | --- | --- | --- | --- | --- |
| $A_1-1+B-2$ | $A_1-1$ | B-2 | $A_1-1/B-2$ | | Predicted | Measured | |
| — | — | — | 0/0 | 1.1 | — | — | 6.9 |
| 0.0125 | 0.0125 | — | 100/0 | 1.4 | — | 0.03 | 7.0 |
| 0.03 | 0.03 | — | 100/0 | 2.0 | — | 0.9 | 7.1 |
| 0.05 | 0.05 | — | 100/0 | 2.5 | — | 1.4 | 7.0 |
| 0.10 | 0.10 | — | 100/0 | 6.8 | — | 5.7 | 9.3 |
| 0.0125 | — | 0.0125 | 0/100 | 1.35 | — | 0.15 | 6.5 |
| 0.03 | — | 0.03 | 0/100 | 2.6 | — | 1.5 | 6.9 |
| 0.05 | — | 0.05 | 0/100 | 3.9 | — | 2.8 | 6.8 |
| 0.18 | — | 0.18 | 0/100 | 7.3 | — | 6.2 | 6.5 |
| 0.0625 | 0.05 | 0.0125 | 100/25 | 7.9 | 1.55 | 6.8 | 8.4 |
| 0.06 | 0.03 | 0.03 | 100/100 | 7.3 | 2.4 | 6.2 | 7.6 |

TABLE 2-continued

| Dosage of addition of test compound (%) | | | | Air content (%) | Entrained air (%) | | Slump (cm) |
| --- | --- | --- | --- | --- | --- | --- | --- |
| $A_1 - 1 + B - 2$ | $A_1 - 1$ | $B - 2$ | $A_1 - 1/B - 2$ | | Predicted | Measured | |
| 0.0625 | 0.0125 | 0.05 | 25/100 | 8.3 | 3.1 | 7.2 | 7.1 |

Test 3

The test procedure of Test 1 was repeated except that a polyoxyethylene glycerol dioleate of general formula (I) wherein k is 3; two of $Z_1^1$, $Z_1^2$, and $Z_1^3$ are oleic acid residues, with the remaining one being a hydrogen atom; and $n_1^1 + n_1^2 + n_1^3$ is equal to 31 (this compound will hereinafter be referred to briefly as $A_1$-2) was used as compound A and that flyash having the physical properties mentioned below was used as the flyash component.

Physical properties of flyash:

| | |
| --- | --- |
| Specific gravity | 2.12 |
| Specific surface area | 4050 cm$^2$/g |
| Loss on ignition | 3.9% |
| Methylene blue adsorption | 0.91 mg/g |

The test results are shown in Table 3.

Test 4

The test procedure of Test 1 was repeated except that a polyethylene glycol monooleate of general formula (II) wherein $n_2$ is 17 and $Z_2$ is an oleic acid residue (this compound will hereinafter referred to briefly as $A_2$-1) was used as compound A and that flyash having the physical properties mentioned below was used as the flyash component.

Physical properties of flyash:

| | |
| --- | --- |
| Specific gravity | 2.12 |
| Specific surface area | 4050 cm$^2$/g |
| Loss on ignition | 3.9% |
| Methylene blue adsorption | 0.91 mg/g |

The test results are shown in Table 4.

TABLE 4

| Dosage of addition of test compound (%) | | | | Air content (%) | Entrained air (%) | | Slump (cm) |
| --- | --- | --- | --- | --- | --- | --- | --- |
| $A_2 - 1 + B - 1$ | $A_2 - 1$ | $B - 1$ | $A_2 - 1/B - 1$ | | Predicted | Measured | |
| — | — | — | 0/0 | 0.4 | — | — | 7.2 |
| 0.0125 | 0.0125 | — | 100/0 | 0.5 | — | 0.1 | 7.6 |
| 0.02 | 0.02 | — | 100/0 | 0.8 | — | 0.4 | 7.7 |
| 0.03 | 0.03 | — | 100/0 | 1.3 | — | 0.9 | 7.9 |
| 0.04 | 0.04 | — | 100/0 | 1.6 | — | 1.2 | 8.0 |
| 0.05 | 0.05 | — | 100/0 | 1.9 | — | 1.5 | 8.2 |
| 0.10 | 0.10 | — | 100/0 | 8.3 | — | 7.9 | 8.9 |
| 0.0125 | — | 0.0125 | 0/100 | 0.8 | — | 0.4 | 7.3 |
| 0.02 | — | 0.02 | 0/100 | 1.1 | — | 0.7 | 7.2 |
| 0.03 | — | 0.03 | 0/100 | 1.5 | — | 1.1 | 7.1 |
| 0.04 | — | 0.04 | 0/100 | 1.9 | — | 1.5 | 6.9 |
| 0.05 | — | 0.05 | 0/100 | 2.3 | — | 1.9 | 6.7 |
| 0.18 | — | 0.18 | 0/100 | 8.1 | — | 7.7 | 4.9 |
| 0.0625 | 0.05 | 0.0125 | 100/25 | 8.0 | 1.9 | 7.6 | 7.9 |
| 0.06 | 0.04 | 0.02 | 100/50 | 7.4 | 1.9 | 7.0 | 7.8 |
| 0.06 | 0.03 | 0.03 | 100/100 | 8.3 | 2.0 | 7.9 | 7.6 |
| 0.06 | 0.02 | 0.04 | 50/100 | 8.8 | 1.9 | 8.4 | 7.4 |
| 0.0625 | 0.0125 | 0.05 | 25/100 | 8.0 | 2.0 | 7.6 | 7.2 |

Test 5

The test procedure of Test 1 was repeated except that a mixture of polyoxyethylene pentaerythritol monoole-

TABLE 3

| Dosage of addition of test compound (%) | | | | Air content (%) | Entrained air (%) | | Slump (cm) |
| --- | --- | --- | --- | --- | --- | --- | --- |
| $A_1 - 2 + B - 1$ | $A_1 - 2$ | $B - 1$ | $A_1 - 2/B - 1$ | | Predicted | Measured | |
| — | — | — | 0/0 | 0.4 | — | — | 7.2 |
| 0.0125 | 0.0125 | — | 100/0 | 0.8 | — | 0.4 | 7.5 |
| 0.02 | 0.02 | — | 100/0 | 1.1 | — | 0.7 | 7.6 |
| 0.03 | 0.03 | — | 100/0 | 1.5 | — | 1.1 | 7.7 |
| 0.04 | 0.04 | — | 100/0 | 1.9 | — | 1.5 | 7.8 |
| 0.05 | 0.05 | — | 100/0 | 2.3 | — | 1.9 | 7.9 |
| 0.12 | 0.12 | — | 100/0 | 7.6 | — | 7.2 | 8.5 |
| 0.0125 | — | 0.0125 | 0/100 | 0.8 | — | 0.4 | 7.3 |
| 0.02 | — | 0.02 | 0/100 | 1.1 | — | 0.7 | 7.2 |
| 0.03 | — | 0.03 | 0/100 | 1.5 | — | 1.1 | 7.1 |
| 0.04 | — | 0.04 | 0/100 | 1.9 | — | 1.5 | 6.9 |
| 0.05 | — | 0.05 | 0/100 | 2.3 | — | 1.9 | 6.7 |
| 0.18 | — | 0.18 | 0/100 | 8.1 | — | 7.7 | 4.9 |
| 0.0625 | 0.05 | 0.0125 | 100/25 | 6.7 | 2.3 | 6.3 | 7.8 |
| 0.06 | 0.04 | 0.02 | 100/50 | 8.0 | 2.2 | 7.6 | 7.5 |
| 0.06 | 0.03 | 0.03 | 100/100 | 8.6 | 2.2 | 8.2 | 7.2 |
| 0.06 | 0.02 | 0.04 | 50/100 | 8.7 | 2.2 | 8.3 | 7.0 |
| 0.0625 | 0.0125 | 0.05 | 25/100 | 9.0 | 2.3 | 8.6 | 6.9 | ate of general formula (III) wherein $n_3^1$ is 0 and $Z_3^1$ is an oleic acid residue; $Z_3^2$, $Z_3^3$ and $Z_3^4$ each is a hydrogen atom, and $n_3^2 + n_3^3 + n_3^4$ is equal to 26 and a polyoxyethylene pentaerythritol dioleate of the same formula (III) wherein $n_3^1$ and $n_3^2$ each is 0; $Z_3^1$ and $Z_3^2$ each is an oleic acid residue; $Z_3^3$ and $Z_3^4$ each is a hydrogen atom; and $n_3^3 + n_3^4$ is equal to 26, which contains an average of 1.6 moles of oleic acid residues per mole (this mixture will hereinafter be referred briefly to as A$_3$-1) was used as compound A and that flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 5.

TABLE 5

| Dosage of addition of test compound (%) | | | | Air content (%) | Entrained air (%) | | Slump (cm) |
|---|---|---|---|---|---|---|---|
| A$_3$ − 1 + B − 1 | A$_3$ − 1 | B − 1 | A$_3$ − 1/B − 1 | | Predicted | Measured | |
| — | — | — | 0/0 | 0.4 | — | — | 7.2 |
| 0.0125 | 0.0125 | — | 100/0 | 1.2 | — | 0.8 | 7.6 |
| 0.02 | 0.02 | — | 100/0 | 1.3 | — | 0.9 | 7.7 |
| 0.03 | 0.03 | — | 100/0 | 1.5 | — | 1.1 | 7.8 |
| 0.04 | 0.04 | — | 100/0 | 1.7 | — | 1.3 | 8.0 |
| 0.05 | 0.05 | — | 100/0 | 1.9 | — | 1.5 | 8.1 |
| 0.12 | 0.12 | — | 100/0 | 8.4 | — | 8.0 | 8.9 |
| 0.0125 | — | 0.0125 | 0/100 | 0.8 | — | 0.4 | 7.3 |
| 0.02 | — | 0.02 | 0/100 | 1.1 | — | 0.7 | 7.2 |
| 0.03 | — | 0.03 | 0/100 | 1.5 | — | 1.1 | 7.1 |
| 0.04 | — | 0.04 | 0/100 | 1.9 | — | 1.5 | 6.9 |
| 0.05 | — | 0.05 | 0/100 | 2.3 | — | 1.9 | 6.7 |
| 0.18 | — | 0.18 | 0/100 | 8.1 | — | 7.7 | 4.9 |
| 0.0625 | 0.05 | 0.0125 | 100/25 | 7.9 | 1.9 | 7.5 | 7.9 |
| 0.06 | 0.04 | 0.02 | 100/50 | 7.7 | 2.0 | 7.3 | 7.7 |
| 0.06 | 0.03 | 0.03 | 100/100 | 8.5 | 2.2 | 8.1 | 7.5 |
| 0.06 | 0.02 | 0.04 | 50/100 | 8.5 | 2.4 | 8.1 | 7.4 |
| 0.0625 | 0.0125 | 0.05 | 25/100 | 7.6 | 2.7 | 7.2 | 7.1 |

Test 6

The test procedure of Test 1 was repeated except that a polyoxyethylene sorbitan trioleate of general formula (IV) wherein $n_4^1$, $n_4^3$ and $n_4^4$ each is 0; $Z_4^1$, $Z_4^3$ and $Z_4^4$ each is an oleic acid residue; $n_4^2$ is 43; and $Z_4^2$ is a hydrogen atom (this compound will hereinafter be referred to briefly as A$_4$-1) was used as compound A and that flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 6.

TABLE 6

| Dosage of addition of test compound (%) | | | | Air content (%) | Entrained air (%) | | Slump (cm) |
|---|---|---|---|---|---|---|---|
| A$_4$ − 1 + B − 1 | A$_4$ − 1 | B − 1 | A$_4$ − 1/B − 1 | | Predicted | Measured | |
| — | — | — | 0/0 | 0.7 | — | — | 6.9 |
| 0.0125 | 0.0125 | — | 100/0 | 1.0 | — | 0.3 | 6.7 |
| 0.02 | 0.02 | — | 100/0 | 1.2 | — | 0.5 | 6.9 |
| 0.03 | 0.03 | — | 100/0 | 1.5 | — | 0.8 | 7.1 |
| 0.04 | 0.04 | — | 100/0 | 1.8 | — | 1.1 | 7.3 |
| 0.05 | 0.05 | — | 100/0 | 2.4 | — | 1.7 | 7.5 |
| 0.10 | 0.10 | — | 100/0 | 7.2 | — | 6.5 | 8.4 |
| 0.0125 | — | 0.0125 | 0/100 | 0.8 | — | 0.1 | 6.4 |
| 0.02 | — | 0.02 | 0/100 | 1.1 | — | 0.4 | 6.3 |
| 0.03 | — | 0.03 | 0/100 | 1.5 | — | 0.9 | 6.3 |
| 0.04 | — | 0.04 | 0/100 | 2.0 | — | 1.3 | 6.2 |
| 0.05 | — | 0.05 | 0/100 | 2.4 | — | 1.7 | 6.1 |
| 0.18 | — | 0.18 | 0/100 | 7.6 | — | 6.9 | 5.3 |
| 0.625 | 0.05 | 0.0125 | 100/25 | 7.2 | 1.8 | 6.8 | 7.6 |
| 0.6 | 0.04 | 0.02 | 100/50 | 7.6 | 1.5 | 7.2 | 7.1 |
| 0.6 | 0.03 | 0.03 | 100/100 | 8.1 | 1.6 | 7.7 | 6.7 |
| 0.6 | 0.02 | 0.04 | 50/100 | 8.1 | 1.8 | 7.7 | 6.6 |
| 0.625 | 0.0125 | 0.05 | 25/100 | 7.7 | 2.0 | 7.3 | 6.3 |

Test 7

The test procedure of Test 1 was repeated except that a polyoxyethylene sorbitan monostearate of general formula (IV) wherein $n_4^1 + n_4^2 + n_4^3$ is equal to 35; $Z_4^1$, $Z_4^2$ and $Z_4^3$ each is a hydrogen atom; $n_4^4$ is 0; and $Z_4^4$ is a stearic acid residue (this compound will hereinafter be referred to briefly as A$_4$-2) was used as compound A and flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 7.

TABLE 7

| Dosage of addition of test compound (%) | | | | Air content (%) | Entrained air (%) | | Slump (cm) |
|---|---|---|---|---|---|---|---|
| $A_4-2+B-1$ | $A_4-2$ | $B-1$ | $A_4-2/B-1$ | | Predicted | Measured | |
| — | — | — | 0/0 | 0.7 | — | — | 6.9 |
| 0.0125 | 0.0125 | — | 100/0 | 0.8 | — | 0.1 | 6.5 |
| 0.02 | 0.02 | — | 100/0 | 0.9 | — | 0.2 | 6.7 |
| 0.03 | 0.03 | — | 100/0 | 1.3 | — | 0.6 | 6.9 |
| 0.04 | 0.04 | — | 100/0 | 1.7 | — | 1.0 | 7.1 |
| 0.05 | 0.05 | — | 100/0 | 2.1 | — | 1.4 | 7.4 |
| 0.18 | 0.18 | — | 100/0 | 8.4 | — | 7.7 | 8.3 |
| 0.0125 | — | 0.0125 | 0/100 | 0.8 | — | 0.1 | 6.4 |
| 0.02 | — | 0.02 | 0/100 | 1.1 | — | 0.4 | 6.3 |
| 0.03 | — | 0.03 | 0/100 | 1.6 | — | 0.9 | 6.3 |
| 0.04 | — | 0.04 | 0/100 | 2.0 | — | 1.3 | 6.2 |
| 0.05 | — | 0.05 | 0/100 | 2.4 | — | 1.7 | 6.1 |
| 0.18 | — | 0.18 | 0/100 | 7.6 | — | 6.9 | 5.3 |
| 0.0625 | 0.05 | 0.0125 | 100/25 | 7.2 | 1.5 | 6.5 | 7.3 |
| 0.06 | 0.04 | 0.02 | 100/50 | 7.4 | 1.4 | 6.7 | 7.2 |
| 0.06 | 0.03 | 0.03 | 100/100 | 7.5 | 1.5 | 6.8 | 6.8 |
| 0.06 | 0.02 | 0.04 | 50/100 | 7.9 | 1.5 | 7.1 | 6.5 |
| 0.0625 | 0.0125 | 0.05 | 25/100 | 7.9 | 1.8 | 7.1 | 6.3 |

Test 8

The test procedure of Test 1 was repeated except that $A_1$-2 was used as compound A and that flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 8.

TABLE 8

| Dosage of addition of test compound (%) | | | | Change (%) in air content with time. The figure in parentheses represents % of initial value. | | | Change (cm) in slump with time | | |
|---|---|---|---|---|---|---|---|---|---|
| $A_1-2+B-1$ | $A_1-2$ | $B-1$ | $A_1-2/B-1$ | Immediately after preparation | After 30 min. | After 60 min. | Immediately after preparation | After 30 min. | After 60 min. |
| 0.12 | 0.12 | — | 100/0 | 7.6 (100) | 6.3 (83) | 5.9 (78) | 8.5 | 7.3 | 5.9 |
| 0.18 | — | 0.18 | 0/100 | 8.1 (100) | 7.4 (91) | 6.9 (85) | 4.9 | 4.3 | 3.9 |
| 0.0675 | 0.054 | 0.0135 | 100/25 | 7.4 (100) | 6.8 (92) | 6.6 (89) | 7.7 | 6.6 | 5.5 |

Test 9

The test procedure of Test 1 was repeated except that $A_2$-1 was used as compound A and that flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 9.

TABLE 9

| Dosage of addition of test compound (%) | | | | Change (%) in air content with time. The figure in parentheses represents % of initial value. | | | Change (cm) in slump with time | | |
|---|---|---|---|---|---|---|---|---|---|
| $A_2-1+B-1$ | $A_2-1$ | $B-1$ | $A_2-1/B-1$ | Immediately after preparation | After 30 min. | After 60 min. | Immediately after preparation | After 30 min. | After 60 min. |
| 0.10 | 0.10 | — | 100/0 | 8.3 (100) | 7.1 (85) | 6.6 (80) | 8.9 | 7.8 | 7.2 |
| 0.18 | — | 0.18 | 0/100 | 8.1 (100) | 7.4 (91) | 6.9 (85) | 4.9 | 4.3 | 3.9 |
| 0.0625 | 0.05 | 0.0125 | 100/25 | 8.0 (100) | 7.6 (95) | 7.1 (89) | 7.9 | 6.5 | 5.9 |

Test 10

The test procedure of Test 1 was repeated except that $A_3$-1 was used as compound A and that flyash having the physical properties mentioned below was used as the flyash component.

Physical properties of flyash:

| | |
|---|---|
| Specific gravity | 2.12 |
| Specific surface area | 4050 cm$^2$/g |
| Loss on ignition | 3.9% |
| Methylene blue adsorption | 0.91 mg/g |

The test results are shown in Table 10.

TABLE 10

| Dosage of addition of test compound (%) | | | | Change (%) in air content with time. The figure in parentheses represents % of initial value. | | | Change (cm) in slump with time | | |
|---|---|---|---|---|---|---|---|---|---|
| $A_3-1 + B-1$ | $A_3-1$ | $B-1$ | $A_3-1/B-1$ | Immediately after preparation | After 30 min. | After 60 min. | Immediately after preparation | After 30 min. | After 60 min. |
| 0.10 | 0.10 | — | 100/0 | 7.4 (100) | 6.0 (81) | 5.5 (74) | 8.7 | 7.9 | 6.7 |
| 0.18 | — | 0.18 | 0/100 | 8.1 (100) | 7.4 (91) | 6.9 (85) | 4.9 | 4.3 | 3.9 |
| 0.0625 | 0.05 | 0.0125 | 100/25 | 7.9 (100) | 7.3 (92) | 6.7 (85) | 7.9 | 6.9 | 6.1 |
| 0.06 | 0.04 | 0.02 | 100/50 | 7.7 (100) | 7.4 (96) | 6.9 (90) | 7.7 | 6.8 | 6.3 |

Test 11

The test procedure of Test 1 was repeated except that $A_4$-1 was used as compound A and that flyash having the physical properties mentioned below was used as the flyash component.

Physical properties of flyash:

| Specific gravity | 2.12 |
|---|---|
| Specific surface area | 4050 cm$^2$/g |
| Loss on ignition | 3.9% |
| Methylene blue adsorption | 0.91 mg/g |

The test results are shown in Table 11.

TABLE 11

| Dosage of addition of test compound (%) | | | | Change (%) in air content with time. The figure in parentheses represents % of initial value. | | | Change (cm) in slump with time | | |
|---|---|---|---|---|---|---|---|---|---|
| $A_4-1 + B-1$ | $A_4-1$ | $B-1$ | $A_4-1/B-1$ | Immediately after preparation | After 30 min. | After 60 min. | Immediately after preparation | After 30 min. | After 60 min. |
| 0.10 | 0.10 | — | 100/0 | 7.2 (100) | 5.3 (74) | 4.6 (64) | 8.4 | 7.1 | 6.4 |
| 0.18 | — | 0.18 | 0/100 | 7.6 (100) | 6.9 (91) | 6.5 (85) | 5.3 | 4.6 | 4.2 |
| 0.0625 | 0.05 | 0.0125 | 100/25 | 7.2 (100) | 7.0 (97) | 6.5 (90) | 7.6 | 6.6 | 6.2 |

Test 12

The test procedure of Test 1 was repeated except that $A_4$-2 was used as compound A and that flyash having the physical properties mentioned below was used as the flyash component.

Physical properties of flyash:

| Specific gravity | 2.12 |
|---|---|
| Specific surface area | 4050 cm$^2$/g |
| Loss on ignition | 3.9% |
| Methylene blue adsorption | 0.91 mg/g |

The test results are shown in Table 12.

Test 13

Preparation of test concrete:

In a laboratory room controlled at 20°±2° C., a 50 liter-tilting mixer was charged successively with a coarse aggregate (hereinafter referred to briefly as G), one-half of a fine aggregate (S), a hydraulic binder (C), the remaining half of S, and water containing the test compound according to the formula shown in Table 13-1 and the charge was mixed for 3 minutes to give a concrete (fresh or unhardened concrete). The target slump and air content immediately after mixing were set at 15±1 cm and 4.5±0.5%, respectively. The hydraulic binder and aggregates used are indicated below. The batch size was 30 liters and the air content and slump were measured immediately after mixing. Then, the concrete was allowed to stand on a mixing plate (immediately after preparation or after 20 minutes or after 40 minutes or after 60 minutes) and after re-mixing with a scoop, the air content and slump were measured again.

Hydraulic binder:

Flyash cement: a 70:30 mixture of ordinary portland cement (specific gravity 3.16) and flyash (specific gravity 2.06, specific surface area 3350 cm$^2$/g, loss on ignition 4.61%, methylene blue adsorption 0.98 mg/g)

Aggregates:

TABLE 12

| Dosage of addition of test compound (%) | | | | Change (%) in air content with time. The figure in parentheses represents % of initial value. | | | Change (cm) in slump with time | | |
|---|---|---|---|---|---|---|---|---|---|
| $A_4-2 + B-1$ | $A_4-2$ | $B-1$ | $A_4-2/B-1$ | Immediately after preparation | After 30 min. | After 60 min. | Immediately after preparation | After 30 min. | After 60 min. |
| 0.18 | 0.18 | — | 100/0 | 8.4 (100) | 6.1 (73) | 4.4 (52) | 8.3 | 7.7 | 6.6 |
| 0.18 | — | 0.18 | 0/100 | 7.6 (100) | 6.9 (91) | 6.5 (85) | 5.3 | 4.6 | 4.2 |
| 0.0625 | 0.05 | 0.0125 | 100/25 | 7.2 (100) | 6.6 (92) | 6.3 (88) | 7.3 | 6.2 | 6.1 |

Fine aggregate: River sand (specific gravity 2.63, FM 2.69)

Coarse aggregate: Crushed stone (specific gravity 2.67, FM 6.70)

TABLE 13-1

| w/c (%) | s/a (%) | W (kg) | C (kg) | S (kg) | G (kg) |
|---|---|---|---|---|---|
| 59.0 | 46 | 189 | 320 | 779 | 928 |

Note:
W: Water
C: Flyash cement
s/a: sand-coarse aggregate ratio

Test compounds:
(1) Compound A $A_1$-1
(2) Compound B B-1
Test method:
Slump: JIS A 1101—Method of Test for Slump of Concrete—
Air content: JIS A 1128 (Method of Test for Air Content of Fresh Concrete by Pressure Method)
The test results are shown in Table 13-2.

TABLE 13-2

| Dosage of addition of test compound (%) | | | Change (%) in air content with time. The figure in parentheses represents % of initial value. | | | | Change (cm) in slump with time | | | |
|---|---|---|---|---|---|---|---|---|---|---|
| $A_1$ − 1 + B − 1 | $A_1$ − 1 | B − 1 | Immediately after preparation | After 20 min. | After 40 min. | After 60 min. | Immediately after preparation | After 20 min. | After 40 min. | After 60 min. |
| 0.123 | 0.123 | — | 4.3 (100) | 4.2 (98) | 3.7 (86) | 3.7 (86) | 16.0 | 14.1 | 13.6 | 12.3 |
| 0.20 | — | 0.20 | 5.2 (100) | 5.0 (96) | 4.6 (88) | 4.5 (87) | 11.8 | 10.6 | 11.2 | 10.5 |
| 0.066 | 0.053 | 0.013 | 4.7 (100) | 4.8 (102) | 4.6 (98) | 4.6 (98) | 15.5 | 14.0 | 13.3 | 12.6 |

The dosage of addition of each test compound is percentage of weight of flyash cement. (The same applies hereinafter)

It is apparent from Tables 1 through 13-2 that the measured entrained air values found for the flyash cement compositions prepared using the AE agent of the invention are considerably higher than the corresponding predicted values, indicating that the AE agent of the invention not only has an outstanding air-entraining effect but also is very effective in the prevention of air loss, particularly air loss in flyash-containing concrete obtainable by using unburned carbon-rich flyash.

Thus, the AE agent of the invention displays excellent AE and air loss-inhibitory effects in flyash-containing cement compositions.

The following examples are further illustrative of the AE agent of the invention.

Example 1

An AE agent for flyash cement compositions was prepared by dissolving 20 parts by weight of a 50:50 mixture of a polyoxyethylene sorbitol dioleate of the formula:

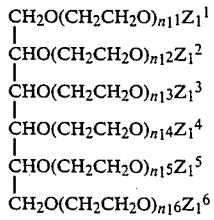

wherein two of $Z_1^1$, $Z_1^2$, ... $Z_1^6$ each is an oleic acid residue, with the remaining four being hydrogen atoms, and $n_1^1 + n_1^2 + \ldots + n_1^6$ is equal to 40 and a polyoxyethylene sorbitol trioleate of the same formula wherein three of $Z_1^1$, $Z_1^2$, ... $Z_1^6$ each is an oleic acid residue, with the remaining three being hydrogen atoms, and $n_1^1 + n_1^2 + \ldots n_1^6$ is equal to 40, and 5 parts by weight of tall oil fatty acid potassium in 75 parts by weight of water.

Example 2

An AE agent for flyash cement compositions was prepared by dissolving 20 parts by weight of a 50:50 mixture of a polyoxyethylene sorbitol dioleate of the formula:

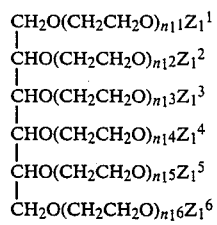

wherein two of $Z_1^1$, $Z_1^2$, ... and $Z_1^6$ each is an oleic acid residue, with the remaining four being hydrogen atoms, and $n_1^1 + n_1^2 + \ldots + n_1^6$ is equal to 40 and a polyoxyethylene sorbitol trioleate of the same formula wherein three of $Z_1^1$, $Z_1^2$, ... and $Z_1^6$ each is an oleic acid residue, with the remaining three being hydrogen atoms, and $n_1^1 + n_1^2 \ldots + n_1^6$ is equal to 40, and 5 parts by weight of potassium oleate in 75 parts by weight of water.

Example 3

An AE agent for flyash cement compositions was prepared by dissolving 20 parts by weight of a polyoxyethylene glycerol dioleate of the formula:

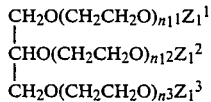

wherein two of $Z_1^1$, $Z_1^2$, and $Z_1^3$ each is an oleic acid residue, with the remaining one being a hydrogen atom, and $n_1^1 + n_1^2 + n_1^3$ is equal to 31 and 5 parts by weight of tall oil fatty acid potassium in 75 parts by weight of water.

Example 4

An AE agent for flyash cement compositions was obtained by dissolving 20 parts by weight of a compound of the formula:

HO(CH$_2$CH$_2$O)$_{17}$Z$_2$ wherein Z$_2$ is an oleic acid residue and 5 parts by weight of tall oil fatty acid potassium in 75 parts by weight of water.

Example 5

An AE agent for flyash cement compositions was obtained by dissolving 20 parts by weight of a mixture of a polyoxyethylene pentaerythritol monooleate of the formula:

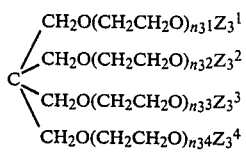

wherein n$_3^1$ is 0; Z$_3^1$ is an oleic acid residue; Z$_3^2$, Z$_3^3$ and Z$_3^4$ each is a hydrogen atom; and n$_3^2$+n$_3^3$+n$_3^4$ is equal to 26 and a polyoxyethylene pentaerythritol dioleate of the same formula wherein n$_3^1$ and n$_3^2$ each is 0; Z$_3^1$ and Z$_3^2$ each is an oleic acid residue; n$_3^3$+n$_3^4$ is equal to 26; and Z$_3^3$ and Z$_3^4$ each is a hydrogen atom, which contains an average of 1.6 moles of oleic acid residues per mole, and 5 parts by weight of tall oil fatty acid potassium in 75 parts by weight of water.

Example 6

An AE agent for flyash cement compositions was obtained by dissolving 20 parts by weight of a compound of the formula:

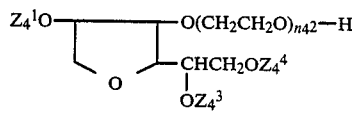

wherein n$_4^2$ is 43 and Z$_4^1$, Z$_4^3$ and Z$_4^4$ each is an oleic acid residue and 5 parts by weight of tall oil fatty acid potassium in 75 parts by weight of water.

Example 7

An AE agent for flyash cement compositions was obtained by dissolving 20 parts by weight of a polyoxyethylene sorbitan monostearate of the formula:

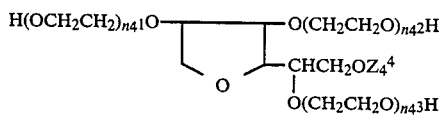

wherein n$_4^1$+n$_4^2$+n$_4^3$ is equal to 35 and Z$_4^4$ is a stearic acid residue and 5 parts by weight of tall oil fatty acid potassium in 75 parts by weight of water.

What we claim is:

1. A composition comprising flyash cement and an air-entraining agent which comprises a compound A selected from the group consisting of polyoxyethylene polyalcohol fatty acid esters of the general formula:

CH$_2$O(CH$_2$CH$_2$O)$_{n_11}$Z$_1^1$
|
CHO(CH$_2$CH$_2$O)$_{n_12}$Z$_1^2$
|
|
|
CH$_2$O(CH$_2$CH$_2$O)$_{n_1k}$Z$_1^k$ wherein k is a whole number of 2 to 8; n$_1^1$, n$_1^2$, ... and n$_1^k$ each is a whole number of 0 to 40; Z$_1^1$, Z$_1^2$ ... and Z$_1^k$ each is a hydrogen atom or a residue group available on elimination of a hydroxy group from a fatty acid of 10 to 30 carbon atoms, provided that at least one of Z$_1^1$, Z$_1^2$ ... and Z$_1^k$ is a residue group available on elimination of a hydroxy group from a fatty acid of 10 to 30 carbon atoms; and n$_1^1$+n$_1^2$+ ... +n$_1^k$ is a whole number of 10 to 60; polyoxyethylene pentaerythritol fatty acid esters of the general formula:

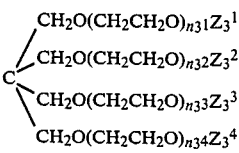

wherein n$_3^1$, n$_3^2$, n$_3^3$ and n$_3^4$ each is a whole number of 0 to 40; Z$_3^1$, Z$_3^2$, Z$_3^3$ and Z$_3^4$ each is a hydrogen atom or a residue group available on elimination of a hydroxy group from a fatty acid of 10 to 30 carbon atoms, provided that at least one of Z$_3^1$, Z$_3^2$, Z$_3^3$ and Z$_3^4$ is a residue group available on elimination of a hydroxy group from a fatty acid of 10 to 30 carbon atoms; and n$_3^1$+n$_3^2$+n$_3^3$+n$_3^4$ is a whole number of 10 to 60; and polyoxyethylene sorbitan fatty acid esters of the general formula:

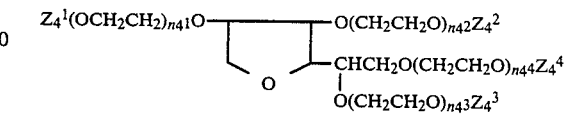

wherein n$_4^1$, n$_4^2$, n$_4^3$ and n$_4^4$ each is a whole number of 0 to 40; Z$_4^1$, Z$_4^2$, Z$_4^3$ and Z$_4^4$ each is a hydrogen atom or a residue group available on elimination of a hydroxy group from a fatty acid of 10 to 30 carbon atoms, provided that at least one of Z$_4^1$, Z$_4^2$, Z$_4^3$ and Z$_4^4$ is a residue group available on elimination of a hydroxy group from a fatty acid of 10 to 30 carbon atoms; and n$_4^1$+n$_4^2$+n$_4^3$+n$_4^4$ is a whole number of 10 to 60; and a compound B which is a fatty acid of 10 to 30 carbon atoms or a salt thereof.

2. The composition of claim 1, in which the compound A is polyoxyethylene polyalcohol fatty acid esters of the general formula:

CH$_2$O(CH$_2$CH$_2$O)$_{n_11}$Z$_1^1$
|
CHO(CH$_2$CH$_2$O)$_{n_12}$Z$_1^2$
|
|
|
CH$_2$O(CH$_2$CH$_2$O)$_{n_1k}$Z$_1^k$ wherein k is a whole number of 2 to 8; n$_1^1$, n$_1^2$, ... and n$_1^k$ each is a whole number of 0 to 40; Z$_1^1$, Z$_1^2$ ... and Z$_1^k$ each is a hydrogen atom or a residue group available on elimination of a hydroxy group from a fatty acid of 10 to 30 carbon atoms, provided that at least one of $Z_1^1$, $Z_1^2$ ... and $Z_1^k$ is a residue group available on elimination of a hydroxy group from a fatty acid of 10 to 30 carbon atoms; and $n_1^1 + n_1^2 + \ldots + n_1^k$ is a whole number of 10 to 60.

3. The composition of claim 2, in which the compound A is a mixture of a polyoxyethylene sorbitol dioleate of the formula:

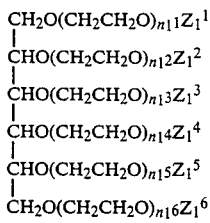

wherein two of $Z_1^1$, $Z_1^2$, ... $Z_1^6$ each is an oleic acid residue, with the remaining four being hydrogen atoms, and $n_1^1 + n_1^2 + \ldots + n_1^6$ is equal to 40 and a polyoxyethylene sorbitol trioleate of the same formula wherein three of $Z_1^1$, $Z_1^2$, ... $Z_1^6$ each is an oleic acid residue, with the remaining three being hydrogen atoms, and $n_1^1 + n_1^2 + \ldots + n_1^6$ is equal to 40, and the compound B is tall oil fatty acid potassium.

4. The composition of claim 2, in which the compound A is a mixture of a polyoxyethylene sorbitol dioleate of the formula:

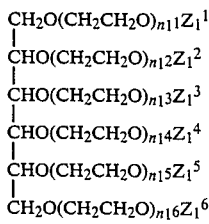

wherein two of $Z_1^1$, $Z_1^2$, ... $Z_1^6$ each is an oleic acid residue, with the remaining four being hydrogen atoms, and $n_1^1 + n_1^2 + \ldots + n_1^6$ is equal to 40 and a polyoxyethylene sorbitol trioleate of the same formula wherein three of $Z_1^1$, $Z_1^2$, ... $Z_1^6$ each is an oleic acid residue, with the remaining three being hydrogen atoms, and $n_1^1 + n_1^2 + \ldots + n_1^6$ is equal to 40, and the compound B is potassium oleate.

5. The composition of claim 2, in which the compound A is a polyoxyethylene glycerol dioleate of the formula:

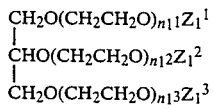

wherein two of $Z_1^1$, $Z_1^2$, and $Z_1^3$ each is an oleic acid residue, with the remaining one being a hydrogen atom, and $n_1^1 + n_1^2 + n_1^3$ is equal to 31, and the compound B is tall oil fatty acid potassium.

6. The composition of claim 1, in which the compound A is polyoxyethylene pentaerythritol fatty acid esters of the general formula:

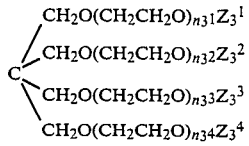

wherein $n_3^1$, $n_3^2$, $n_3^3$ and $n_3^4$ each is a whole number of 0 to 40; $Z_3^1$, $Z_3^2$, $Z_3^3$ and $Z_3^4$ each is a hydrogen atom or a residue group available on elimination of a hydroxy group from a fatty acid of 10 to 30 carbon atoms, provided that at least one of $Z_3^1$, $Z_3^2$, $Z_3^3$ and $Z_3^4$ is a residue group available on elimination of a hydroxy group from a fatty acid of 10 to 30 carbon atoms; and $n_3^1 + n_3^2 + n_3^3 + n_3^4$ is a whole number of 10 to 60.

7. The composition of claim 6, in which the compound A is a mixture of a polyoxyethylene pentaerythritol monooleate of the formula:

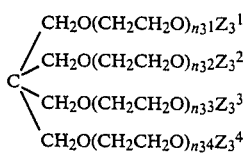

wherein $n_3^1$ is 0; $Z_3^1$ is an oleic acid residue; $Z_3^2$, $Z_3^3$ and $Z_3^4$ each is a hydrogen atom; and $n_3^2 + n_3^3 + n_3^4$ is equal to 26 and a polyoxyethylene pentaerythritol dioleate of the same formula wherein $n_3^1$ and $n_3^2$ each is 0; $Z_3^1$ and $Z_3^2$ each is an oleic acid residue; $n_3^3 + n_3^4$ is equal to 26; and $Z_3^3$ and $Z_3^4$ each is a hydrogen atom, which contains an average of 1.6 moles of oleic acid residues per mole, and the compound B is tall oil fatty acid potassium.

8. The composition of claim 1, in which the compound A is polyoxyethylene sorbitan fatty acid esters of the general formula:

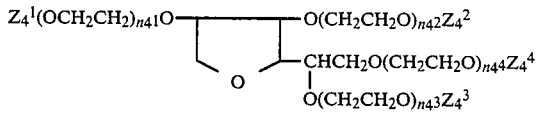

wherein $n_4^1$, $n_4^2$, $n_4^3$ and $n_4^4$ each is a whole number of 0 to 40; $Z_4^1$, $Z_4^2$, $Z_4^3$ and $Z_4^4$ each is a hydrogen atom or a residue group available on elimination of a hydroxy group from a fatty acid of 10 to 30 carbon atoms, provided that at least one of $Z_4^1$, $Z_4^2$, $Z_4^3$ and $Z_4^4$ is a residue group available on elimination of a hydroxy group from a fatty acid of 10 to 30 carbon atoms; and $n_4^1 + n_4^2 + n_4^3 + n_4^4$ is a whole number of 10 to 60.

9. The composition of claim 8, in which the compound A is a compound of the formula:

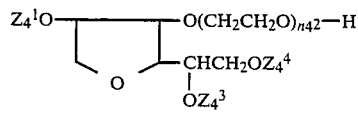

wherein $n_4^2$ is 43 and $Z_4^1$, $Z_4^3$ and $Z_4^4$ each is an oleic acid residue, and the compound B is tall oil fatty acid potassium.

10. The composition of claim 8, in which the compound A is a polyoxyethylene sorbitan monostearate of the formula:
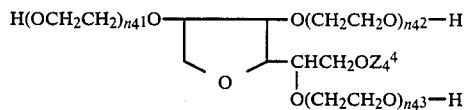
wherein $n_4^1 + n_4^2 + n_4^3$ is equal to 35 and $Z_4^4$ is a stearic acid residue, and the compound B is tall oil fatty acid potassium.
* * * * *

UNITED STATES PATENT AND TRADEMARK OFFICE
CERTIFICATE OF CORRECTION

PATENT NO. : 4,828,619

DATED : May 9, 1989

INVENTOR(S) : SOUJI MATSUSHITA, et al

It is certified that error appears in the above-identified patent and that said Letters Patent is hereby corrected as shown below:

On the Title Page, Item [75]: The last inventor's name has been misspelled, it should read:

-- susumu tahara --

Signed and Sealed this

Twentieth Day of February, 1990

*Attest:*

JEFFREY M. SAMUELS

*Attesting Officer*  *Acting Commissioner of Patents and Trademarks*